United States Patent
Wang

(10) Patent No.: US 9,143,189 B2
(45) Date of Patent: Sep. 22, 2015

(54) MOBILE DEVICE SEARCHING USING MULTIPLE ANTENNAS

(75) Inventor: Shuangquan Wang, Morganville, NJ (US)

(73) Assignee: BROADCOM CORPORATION, Irvine, CA (US)

(*) Notice: Subject to any disclaimer, the term of this patent is extended or adjusted under 35 U.S.C. 154(b) by 472 days.

(21) Appl. No.: 13/526,642

(22) Filed: Jun. 19, 2012

(65) Prior Publication Data
US 2013/0260695 A1    Oct. 3, 2013

Related U.S. Application Data

(60) Provisional application No. 61/618,049, filed on Mar. 30, 2012.

(51) Int. Cl.
*H04W 56/00* (2009.01)
*H04W 24/00* (2009.01)
(Continued)

(52) U.S. Cl.
CPC ............ *H04B 1/7083* (2013.01); *H04B 7/0865* (2013.01); *H04J 11/0069* (2013.01)

(58) Field of Classification Search
CPC ..... H04W 56/00; H04W 24/00; H04W 64/00; H04B 17/00; H04B 7/02; H04B 1/7083; H04B 7/08; H04B 7/216; H04J 3/06; H04J 11/00; H04K 1/10; H04L 27/38; H04L 1/02; H04L 27/14; H04L 27/22; H04L 5/14; H04L 27/00; G06F 7/00; G06F 7/38
See application file for complete search history.

(56) References Cited

U.S. PATENT DOCUMENTS 5,644,519 A * 7/1997 Yatim et al. ............... 708/523
7,924,930 B1 * 4/2011 Salhotra et al. ............ 375/260
(Continued)

FOREIGN PATENT DOCUMENTS

CN   101257340 A   9/2008
CN   101547033 A   9/2009
(Continued)

OTHER PUBLICATIONS

European Search Report in co-pending, related EP Application No. 13001263.6, mailed Jul. 12, 2013.

*Primary Examiner* — Edward Urban
*Assistant Examiner* — Ralph H Justus
(74) *Attorney, Agent, or Firm* — McDermott Will & Emery LLP

(57) ABSTRACT

Disclosed are various embodiments providing selecting various schemes for combining antenna signals for synchronization. For example, processing circuitry determines a first weight for a first antenna based on a signal strength metric of the first antenna and a second weight for a second antenna based on a signal strength metric of the second antenna. The processing circuitry receives a synchronization signal via the first antenna and the second antenna. Then the processing circuitry may weight the synchronization signal received via the first antenna according to the first weight to generate a first weighted synchronization signal and weight the synchronization signal received via the second antenna according to the second weight to generate a second weighted synchronization signal. The processing circuitry further combines the first weighted synchronization signal and the second weighted synchronization signal to generate a combined synchronization signal.

20 Claims, 5 Drawing Sheets

(51) Int. Cl.
  *H04B 17/00* (2015.01)
  *H04B 1/7083* (2011.01)
  *H04J 11/00* (2006.01)
  *H04B 7/08* (2006.01)

(56) References Cited

U.S. PATENT DOCUMENTS

| | | | |
|---|---|---|---|
| 8,374,132 B2* | 2/2013 | Miura et al. | 370/329 |
| 2002/0159542 A1* | 10/2002 | Kokkonen et al. | 375/324 |
| 2002/0193146 A1 | 12/2002 | Wallace et al. | |
| 2004/0009794 A1* | 1/2004 | Proctor et al. | 455/575.7 |
| 2004/0052228 A1 | 3/2004 | Tellado et al. | |
| 2005/0207393 A1* | 9/2005 | Becker et al. | 370/350 |
| 2006/0092902 A1* | 5/2006 | Schmidt | 370/342 |
| 2007/0142009 A1 | 6/2007 | Scarpa et al. | |
| 2007/0185951 A1* | 8/2007 | Lee et al. | 708/493 |
| 2008/0273522 A1* | 11/2008 | Luo et al. | 370/350 |
| 2008/0279124 A1* | 11/2008 | Furueda et al. | 370/280 |
| 2011/0249760 A1* | 10/2011 | Chrisikos et al. | 375/259 |
| 2012/0071106 A1 | 3/2012 | Kadous et al. | |
| 2012/0165037 A1* | 6/2012 | Bull et al. | 455/456.1 |
| 2013/0176991 A1* | 7/2013 | Yi | 370/336 |

FOREIGN PATENT DOCUMENTS

| | | | | |
|---|---|---|---|---|
| CN | 201010251908.1 | * | 8/2010 | H04W 56/00 |
| CN | 101841508 A | | 9/2010 | |
| EP | 1227631 A1 | | 7/2002 | |
| WO | 2012/091855 A1 | | 7/2012 | |

* cited by examiner

Equal Gain Scheme

|       | AGC  | Weight |
|-------|------|--------|
| Ant 1 | .956 | 1      |
| Ant 2 | .963 | 1      |

FIG. 6A

Selective Combining Scheme

|       | AGC  | Weight |
|-------|------|--------|
| Ant 1 | .921 | 0      |
| Ant 2 | .382 | 1      |

FIG. 6B

Signal Strength Metric Based Combing Scheme

|       | AGC  | Weight |
|-------|------|--------|
| Ant 1 | .864 | 1.157  |
| Ant 2 | .987 | 1.013  |

FIG. 6C

MOBILE DEVICE SEARCHING USING MULTIPLE ANTENNAS

CROSS-REFERENCE TO RELATED APPLICATIONS

This application is a utility application that claims priority to co-pending U.S. Provisional Patent Application titled, "Cellular Baseband Processing", having Ser. No. 61/618,049, filed Mar. 30, 2012, which is entirely incorporated herein by reference.

BACKGROUND

Wireless mobile devices may connect to various base stations within a cellular network to facilitate data communication over the cellular network. Prior to data communication, a wireless mobile device must first attach or connect to the cellular network. The attachment process requires the wireless mobile device to perform a cell search to identify a base station within the cell. Performing a cell search may take a substantial amount of time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 6A is a diagram of an example of an equal gain scheme used by a mobile device in the wireless communication system of FIG. 1, in accordance with various embodiments of the present disclosure.

FIG. 6B is a diagram of an example of a selective combining scheme used by a mobile device in the wireless communication system of FIG. 1, in accordance with various embodiments of the present disclosure.

FIG. 6C is a diagram of an example of a signal strength metric based combining scheme used by a mobile device in the wireless communication system of FIG. 1, in accordance with various embodiments of the present disclosure.

DETAILED DESCRIPTION

The present disclosure relates to performing a cell search by a wireless mobile device using multiple antennas. When multiple antennas are configured to receive a signal, each antenna may exhibit properties that affect wireless reception. Various schemes of combining data received by two or more receiving antennas may boost performance in a cell search. Additionally, determining which combination scheme to use is further discussed below.

Figure 1:
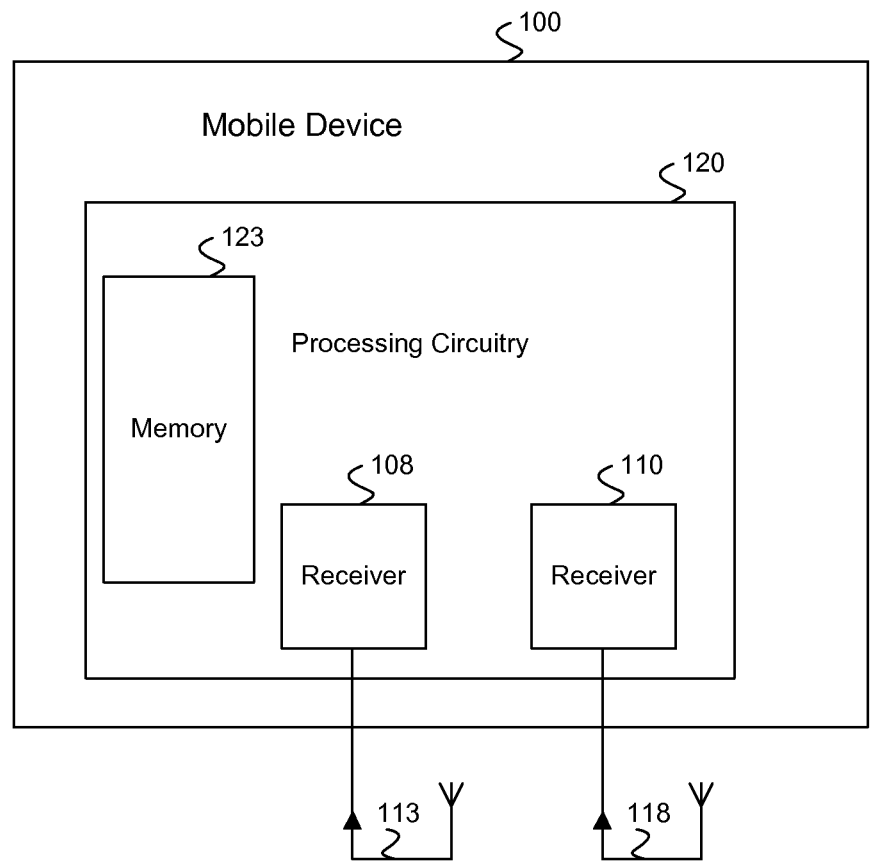
FIG. 1 is a drawing of an example of a wireless communication system, in accordance with various embodiment of the present disclosure.
Figure 1:
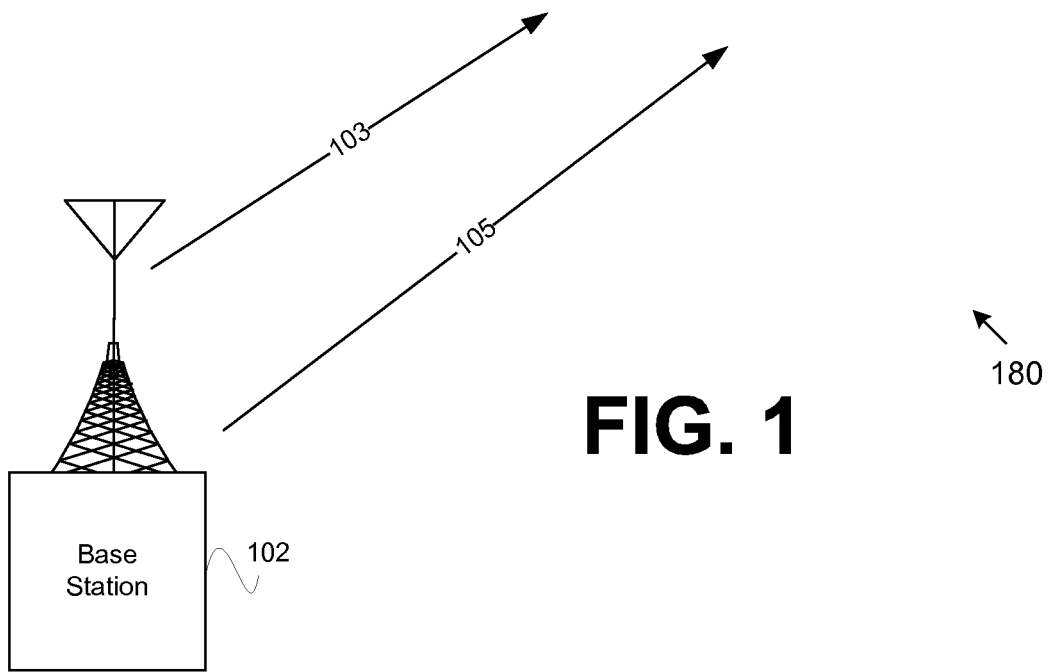

FIG. 1 is a drawing of an example of a wireless communication system 180, in accordance with various embodiment of the present disclosure. Referring to FIG. 1, there is shown a mobile device 100 and a base station 102. The mobile device 100 includes a plurality of receiving antennas 113, 118 coupled to respective receivers 108, 110. Additionally, the mobile device 100 includes processing circuitry 120 communicatively coupled to one or more receivers 108, 110. Memory 123 may further be included within processing circuitry 120. The wireless communication system 180 may also include one or more base stations 102. Base stations 102 may communicate wirelessly with the mobile device 100. A base station 102 may transmit synchronization signals 103, 105 to the mobile device 100 to facilitate a cell search.

In various embodiments, the mobile device 100 includes a first antenna 113 for receiving wireless signals and a second antenna for receiving wireless signals. Although two antennas are shown, more than two receiving antennas may be used by the mobile device 100. In various embodiments, the antennas 113, 118 are physically and separately disposed onto a printed circuit board contained within the mobile device.

Each antenna 113, 118 is communicatively coupled to a respective receiver 108, 110. The receivers 108, 110 may include suitable logic, circuitry, interfaces and/or code that may be operable to perform one or more receive functions that may include a physical (PHY) layer function for the reception or signals. These PHY layer functions may include, but are not limited to, the amplification of received radio frequency (RF) signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals are received via the receiving antennas 113, 118. The receivers 108, 110 may be operable to process the received RF signals to generate baseband signals. Furthermore, the receivers 108, 110 of the mobile device 100 may be implemented as a portion of the processing circuitry.

In various embodiments, the processing circuitry 120 is implemented as at least a portion of a microprocessor. The processing circuitry 120 may include one or more circuits and/or one or more microprocessors. In yet other embodiments, processing circuitry 120 may include one or more software modules executable within one or more processing circuits. In this case, software modules are stored in memory 123 and executed by one or more microprocessors within the processing circuitry 120. The processing circuitry 120 may be configured to execute operations to facilitate a cell search for establishing a wireless communication link with any available base station 102.

A base station 102 is configured to broadcast wireless signals to be received by one or more mobile devices 100 within the physical transmission range of the base station 102. To this end, the base station 102 effectuates a cellular wireless network. In various embodiments, the base station 102 transmits a primary synchronization signal (psync) 103 and a secondary synchronization signal (ssync) 105 to facilitate a cell search by a mobile device 100. The psync 103 and ssync 105 are received by one or more antennas 113, 118 of the mobile device 100. In various embodiments, the psync 103 allows the mobile device 100 to ascertain a time slot boundary. In this respect, data communication is performed according to transmitting and receiving with respect to predetermined time slots. Thus, a mobile device 100 that wishes to communicate over a cellular network must ascertain the boundaries of a time slot. Furthermore, a plurality of time slots may make up a frame. An ssync 105 may be used by a mobile device 100 to ascertain frame boundaries, as frame boundaries are made up of systematically repeating time slots.

When a mobile device 100 determines the transmission boundaries (e.g., time slot boundary, frame boundary, etc.) according to synchronization signals 103, 105, the mobile device 100 can use the determined transmission boundaries to identify a scrambling code associated with a particular base station 102. By identifying the scrambling code, a mobile device 100 may complete searching for a cellular network. The mobile device 100 may attach itself to the cellular network and begin communicating data over the network.

Various embodiments of the present disclosure address receiving synchronization signals 103, 105 using a plurality of receiving antennas 113, 118. The processing circuitry 120 employed by the mobile device 100 may be configured to determine an appropriate combination scheme to combine a received synchronization signal 103, 105 received by each receiving antenna 113, 118. To this end, various embodiments of the present disclosure are directed to allowing a mobile device 100 with multiple receiving antennas 113, 118 to flexibly combine signals during a cell search and before a mobile device 100 completes attaching to the network.

Figure 2:
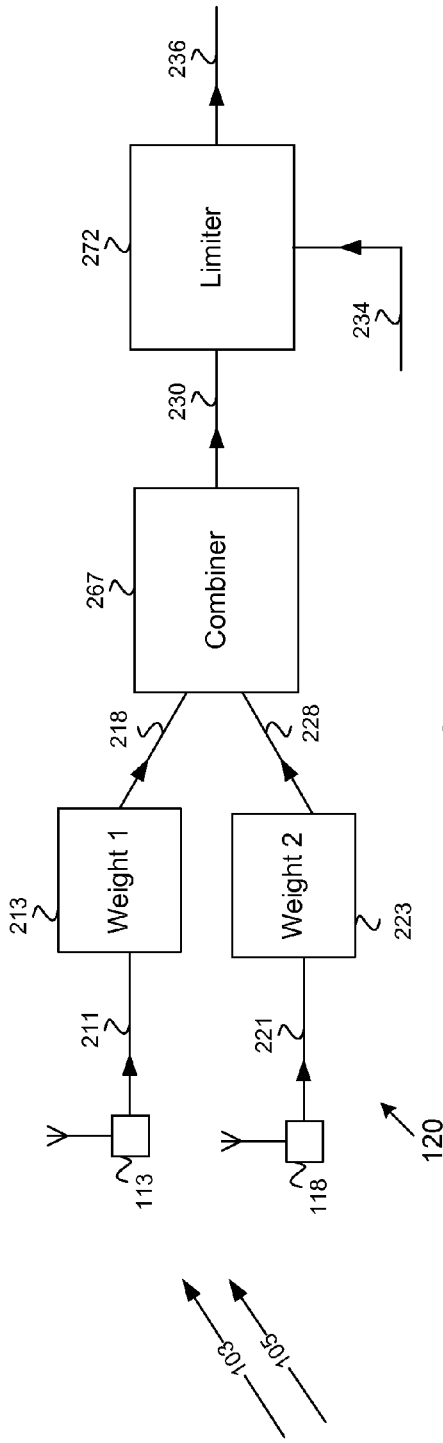
FIG. 2 is a diagram of an example of at least a portion of a mobile device in the wireless communication system of FIG. 1, in accordance with various embodiments of the present disclosure.

FIG. 2 is a diagram of an example of at least a portion of a mobile device in the wireless communication system 180 (FIG. 1), in accordance with various embodiments of the present disclosure. Referring to FIG. 2, there is shown a various signals and components included within the processing circuitry 120. In various embodiments, the components of the processing circuitry 120 are implemented as at least a portion of a microprocessor. These components of the processing circuitry 120 may further include one or more circuits and/or one or more microprocessors. In yet other embodiments, the components of the processing circuitry 120 may include one or more software modules executable within one or more processing circuits. In this case, software modules are stored in memory 123 (FIG. 1) and executed by one or more microprocessors within the processing circuitry 120.

As seen in FIG. 2, a psync 103 and/or ssync 105 is independently received by a plurality of antennas 113, 118. The synchronizing signal 103, 105 received by the first antenna 113 and processed by receiving circuitry is depicted as a first processed synchronization signal 211. The same synchronizing signal 103, 105 received by the second antenna 118 and processed by receiving circuitry is depicted as a second processed synchronization signal 221. Thus, although the same synchronizing signal 103, 105 is transmitted to the receiving antennas 113, 118 of a mobile device, each antenna 113, 118 may receive the synchronizing signal 103, 105 differently such that the first processed synchronization signal 211 is not identical to the second processed synchronization signal 221. Some examples, among others, that explain this occurrence is a difference in the physical construction of the antennas, a difference in the physical location of the antennas, any physical obstructions that affect the antennas differently, or any other factor that changes the physical characteristics of a particular antenna.

In various embodiments, a first weight component 213 is applied to the first processed synchronization signal 211 to generate a first weighted synchronization signal 218. Similarly, a second weight component 223 is applied to the second processed synchronization signal 221 to generate a second weighted synchronization signal 228.

Furthermore, the processing circuitry 120 includes a combiner component 267 that combines the first weighted synchronization signal 218 and the second weighted synchronization signal 228 to generate a combined synchronization signal 230. In one embodiment, among others, the combiner component 267 includes an adder that sums inputs to generate a summed output. The processing circuitry 120 may also include a limiter component 272 to limit the magnitude of the combined synchronization signal 230 for generating a limited combined synchronization signal 236. In this respect, due to operations performed by the combiner component 267, the magnitude of the combined synchronization signal 230 may exceed a desirable range. The limiter component 272 may be configured to perform one or more limiting operations to limit the magnitude of its input. A control signal 234 may be used to select a particular limiting operation.

In one embodiment, among others, a limiting component 272 employs a saturation function. A saturation function limits an input to one extreme or another extreme of a predetermined range if the input exceeds the predetermined range. For example, if the saturation function is configured to limit inputs to a range of −128 to 127, inputs less than −128 (e.g., −129, −130, −256, etc.) are saturated to a value of −128. Similarly, inputs greater than 127 (e.g., 128, 130, 203, etc.) are saturated to a value of 127. Inputs within the range of −128 to 127, inclusively, remain unaffected by the saturation operation.

In an alternative embodiment, the limiter 272 employs a bit shift operation to effectively divide an input in order to reduce the magnitude of the output. As a non-limiting example, the control signal 234 selects whether the limiter component 272 employs a bit shift operation, a saturation operation, a bit truncation operation, or any other magnitude limiting operation.

Furthermore, with reference to FIG. 2, various embodiments of the present disclosure describe implementing various weighting schemes to signals received by the antennas 113, 118 coupled to a mobile device 100 (FIG. 1). Signal weights 213, 223 can be determined based on one signal strength metric or a combination of signal strength metrics. Non-limiting examples of signal strength metrics include automatic gain control (AGC) levels, signal to noise ratio (SNR), degree of Doppler shift, or any combination thereof. In this respect, one or more signal strength metrics may be determined by the processing circuitry 120 for each antenna 113, 118. Accordingly, respective weights 213, 223 can be calculated for each antenna 113, 118 based on the determined signal strength metrics, as will be discussed in further detail below.

Figure 3:
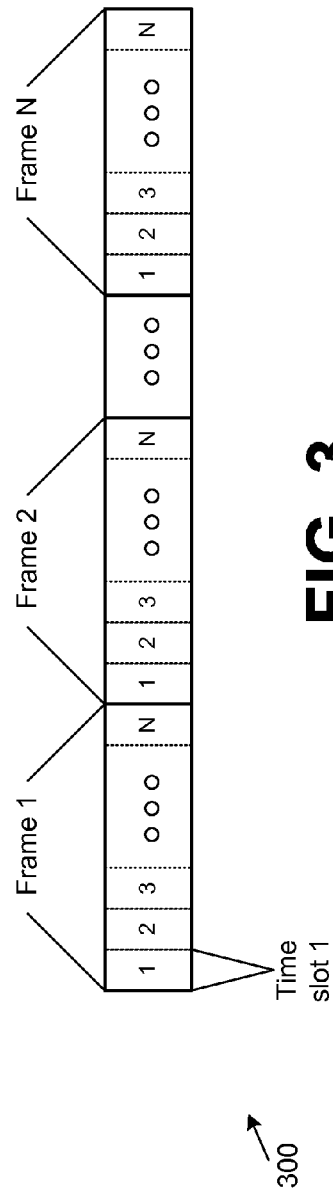
FIG. 3 is a diagram of an example of a data communication format used by a mobile device in the wireless communication system of FIG. 1, in accordance with various embodiments of the present disclosure.

Moving onto FIG. 3, shown is a diagram of an example of a data communication format used by a mobile device in the wireless communication system 180 (FIG. 1), in accordance with various embodiments of the present disclosure. FIG. 3 depicts data communication in accordance with a data frame format 300. As a non-limiting example, the data frame format 300 is used to facilitate a subsequent reception of data.

The data frame format 300 includes a plurality of repeating data frames. Each data frame is made up of a predetermined number of time slots. Accordingly, data communication between a base station 102 (FIG. 1) and a mobile device 100 (FIG. 1) complies with this data frame format 300 by first synchronizing. For example, a mobile device 100 must ascertain transmission boundaries such as a time slot boundary and/or frame boundary to determine when to expect data reception from a base station 102. Therefore, the mobile device 100 and the base station 102 must synchronize in order to establish the transmission boundaries of the data frame format 300.

To achieve synchronization, a psync 103 (FIG. 1) may be used for establishing a time slot boundary. In this respect, a base station 102 transmits a psync signal 103 to a mobile device 100. This psync signal 103 is received by a plurality of antennas 113, 118 (FIG. 1) of the mobile device 100. Due to the physical properties of each receiving antenna 113, 118, the received psync signal, received by each antenna 113, 118 may exhibit varying signal strengths and/or signal qualities. Based on the received psync signals, the processing circuitry 120 (FIG. 1) of the mobile device 100 may ascertain a time slot boundary.

Similarly, a base station 102 transmits an ssync signal 105 (FIG. 1) to the mobile device 100. This ssync signal 105 is received by the plurality of antennas 113, 118 of the mobile device 100. Again, the received ssync signal may exhibit varying signal strengths and/or signal qualities for each receiving antenna 113, 118. Based on the received ssync signals, the processing circuitry 120 of the mobile device 100 may ascertain a frame boundary, and a scrambling code may be identified to start data transmission. For example, once the processing circuitry 120 has ascertained at least a time slot boundary and/or a frame boundary, the processing circuitry may then identify a scrambling code from a base station 102 (FIG. 1) over a cellular network based on the ascertained transmission boundaries. To this end, various embodiments of the present disclosure address using multiple receiving antennas 113, 118 to combine received synchronization signals 103, 105 before a mobile device 100 begins transmission according to a data frame format 300.

Figure 4:
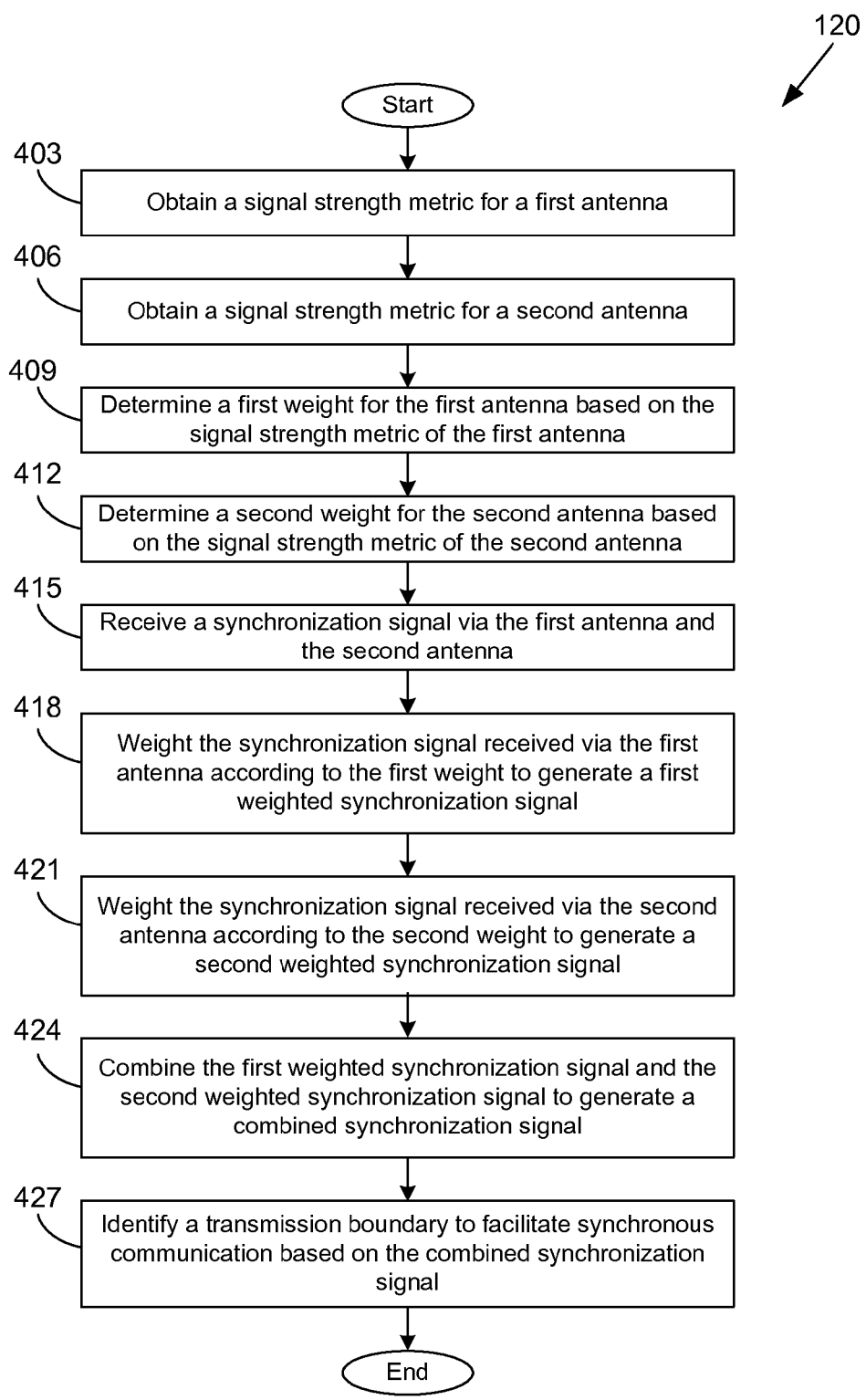
FIG. 4 is a flowchart illustrating an example of functionality implemented as portions of the processing circuitry of a mobile device in the wireless communication system of FIG. 1, according to various embodiments of the present disclosure.

Referring next to FIG. 4, shown is a flowchart illustrating an example of functionality implemented as portions of the processing circuitry of a mobile device in the wireless communication system 180 (FIG. 1), according to various embodiments of the present disclosure. It is understood that the flowchart of FIG. 4 provides merely an example of the many different types of functional arrangements that may be employed to implement the operation of the processing circuitry 120 as described herein. As an alternative, the flowchart of FIG. 4 may be viewed as depicting an example of steps of a method implemented in the processing circuitry 120 according to one or more embodiments.

To begin, processing circuitry 120 obtains a signal strength metric for a first antenna 113 (FIG. 1), as seen in block 403, and obtain a signal strength metric for a second antenna 118 (FIG. 1), as seen in block 406. Non-limiting examples of signal strength metrics include automatic gain control (AGC) levels, signal to noise ratio (SNR), degree of Doppler shift, or any combination thereof. Next, the processing circuitry 120 determines a first weight 213 (FIG. 2) for the first antenna 113 based on the signal strength metric of the first antenna 113, as seen in block 409, and determines a second weight 223 (FIG. 2) for the second antenna 118 based on the signal strength metric of the second antenna 118, as seen in block 412. Respective weights 213, 223 are calculated for each antenna 113, 118 based on the determined signal strength metrics according to various weighting schemes, as will be discussed in further detail below.

In block 415, the processing circuitry 120 receives a synchronization signal 103, 105 (FIG. 1) via the first antenna 113 and the second antenna 118. Non-limiting examples of a synchronization signals are a psync 103, an ssync 105, or any other signal that identifies a transmission boundary to facilitate subsequent transmission using a synchronized data frame format 300 (FIG. 3). In block 418, the processing circuitry 120 weights the synchronization signal 103, 105 received via the first antenna 113 according to the first weight 213 to generate a first weighted synchronization signal 218. And, in block 421, the processing circuitry 120 weights the synchronization signal 103, 105 received via the second antenna 118 according to the second weight 223 to generate a second weighted synchronization signal 228. In various embodiments, weighting is performing by multiplying a signal by a weight to scale the amplitude of the signal according to the weight. To this end, signals 211, 221 (FIG. 2) processed with a higher weight 213, 223, may have a greater impact on the resulting combined signal 230 (FIG. 2) than those signals processed with a lower weight. In various embodiments, a weight of 1 results in no weighting of the signal and a weight of zero effectively deselects the signal by zeroing out the signal. In various embodiments, the assigned weight varies from slot to slot.

Next, the processing circuitry 120 combines the first weighted synchronization signal 218 and the second weighted synchronization signal 228 to generate a combined synchronization signal 230, as depicted by block 424. In various embodiments, a combiner component 267 (FIG. 2) is used. The combiner component 267 may include an adder that sums inputs to generate a summed output. In various embodiments, with regard to the ssync signal, the processing circuitry 120 may apply a matrix transformation on the combined synchronization signal 230 or a matrix transformation on each of the signals 218, 228 prior to combination. The former method may save some operations to perform the matrix transformations. One non-limiting example of a matrix transformation is a Fast Hadamard Transformation. In other embodiments the processing circuitry 120 limits the magnitude of the combined synchronization signal 230 according to a control signal 234 (FIG. 2) that specifies a limitation scheme.

In block 427, the processing circuitry 120 identifies a transmission boundary to facilitate synchronous communication based on the combined synchronization signal 230. As one example, among others, the transmission boundary is a time slot boundary or a frame boundary.

In various embodiments, the flowchart of FIG. 4 may be implemented for processing a psync 103 as a primary synchronization signal and then subsequently processing an ssync 105 as a secondary synchronization signal. In this case, the same weights 213, 223 may different for processing both these synchronization signals 103, 105.

Figure 5:
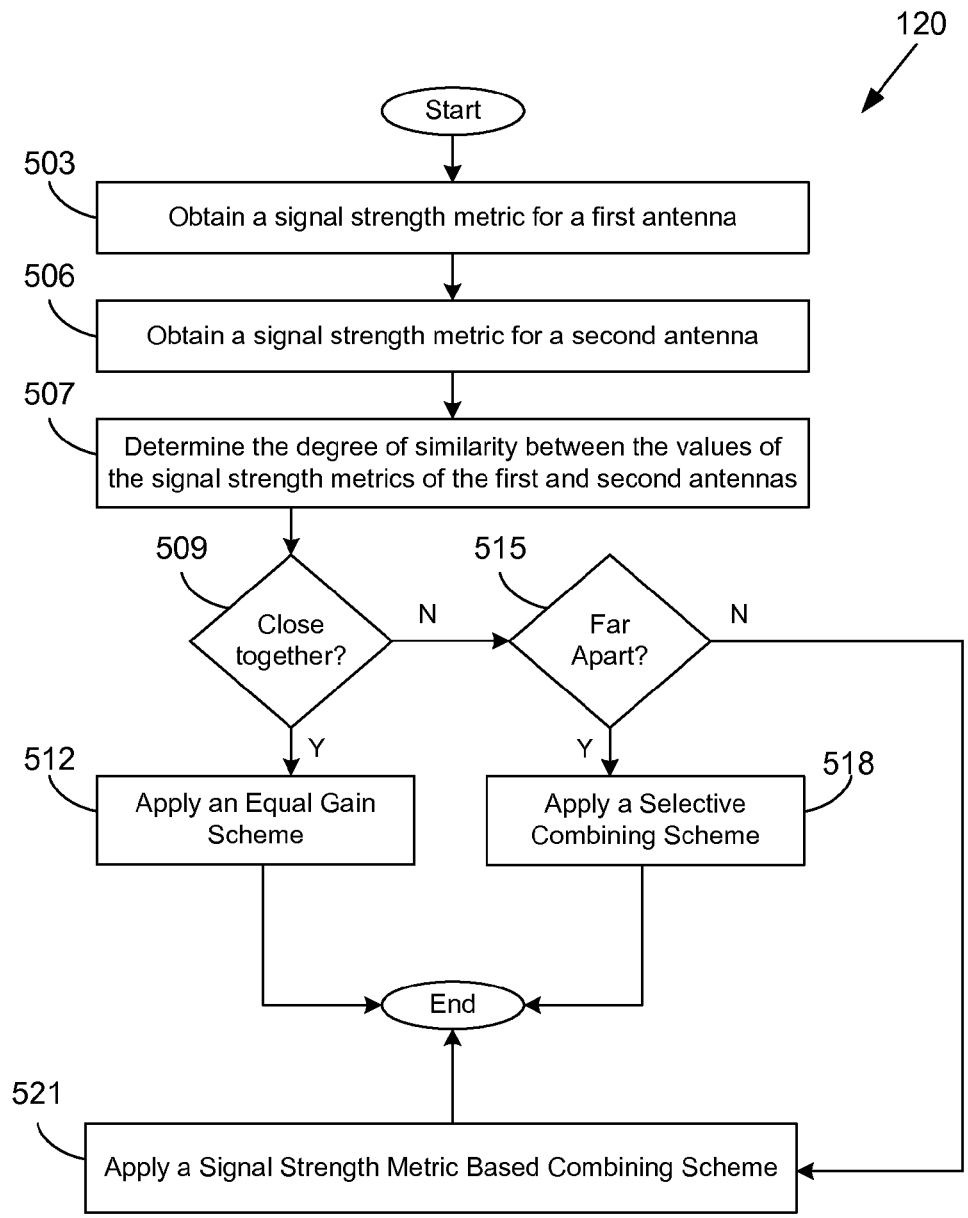
FIG. 5 is a flowchart illustrating an example of functionality implemented as portions of the processing circuitry of a mobile device in the wireless communication system of FIG. 1, according to various embodiments of the present disclosure.

Referring next to FIG. 5, shown is a flowchart illustrating an example of functionality implemented as portions of the processing circuitry of a mobile device in the wireless communication system 180 (FIG. 1), according to various embodiments of the present disclosure. It is understood that the flowchart of FIG. 5 provides merely an example of the many different types of functional arrangements that may be employed to implement the operation of the processing circuitry 120 as described herein. As an alternative, the flowchart of FIG. 5 may be viewed as depicting an example of steps of a method implemented in the processing circuitry 120 according to one or more embodiments.

FIG. 5 demonstrates examples of various combination schemes for determining weights 213, 223 (FIG. 2) for processing synchronization signals 103, 105 (FIG. 1). Particularly, FIG. 5 demonstrates how to select a combination scheme. Non-limiting examples of combination schemes include an equal gain scheme, a selective combining scheme, and a signal strength metric based combining scheme. To determine the appropriate scheme, the processing circuitry 120 analyzes one or more signal strength metrics associated with each of the receiving antennas 113, 118 (FIG. 1).

To begin, the processing circuitry 120 obtains a signal strength metric for a first antenna 113, as seen in block 503, and obtains a signal strength metric for a second antenna 118, as seen in block 506. In block 507, the processing circuitry 120 determines the degree of similarity between the values of the signal strength metrics of the first and second antennas. In this respect, the processing circuitry 120 compares the values of the signal strength metrics associated with each antenna 113, 118. If these values are close together, as seen in block 509, then the processing circuitry 120 applies an equal gain scheme, as seen in block 512. For example, when the difference between the signal strength metric of the first antenna 113 and the signal strength metric of the second antenna 118 is within a predetermined threshold, then the processing circuitry 120 may assign equal weights to the first antenna 113 and the second antenna 118. As another non-limiting example, the processing circuitry 120 may analyze whether a ratio of the signal strength metric of the first antenna 113 over the signal strength metric of the second antenna 118 is within a predetermined threshold range. That is to say, if this ratio is close to 1, then the signal strengths of the first and second antennas 113, 118 are considered to be close together. Thus, under the equal gain scheme, an equal weight is applied when the respective signal strength metrics are close and not necessarily identical.

If, however, the values are far apart, as seen in block 515, then the processing circuitry 120 applies a selective combining scheme, as seen in block 518. For example, when the first value is less than the second value by at least a predetermined threshold value, then the processing circuitry 120 may assign a weight of zero for one of the antennas 113, 118. As another non-limiting example, the processing circuitry 120 may analyze whether a ratio of the signal strength metric of the first antenna 113 over the signal strength metric of the second antenna 118 is exceeds a predetermined threshold range. To this end, if this ratio is much greater than 1 or much less than 1, then the signal strengths of the first and second antennas 113, 118 are considered to be far apart. Thus, under the selective combining scheme, one antenna is deselected when it has significantly inferior signal strength relative to another antenna.

When the values are neither close together not far apart, then the processing circuitry 120 may apply a signal strength metric based combining scheme, as seen in block 521. As another non-limiting example, the processing circuitry 120 may analyze whether a ratio of the signal strength metric of the first antenna 113 over the signal strength metric of the second antenna 118 is within a first predetermined threshold range and whether the ratio exceeds a second predetermined threshold range. As another example, the processing circuitry 120 may apply the signal strength metric based combining scheme as a default scheme when other schemes are not appropriate. Thus, in this scheme, the processing circuitry 120 assigns a weight 213, 223 based on a mathematical expression of the one or more signal strength metrics. In a non-limiting example, the processing circuitry 120 may use a linear expression or non-linear expression to derive a weight based on the one or more signal quality metric.

FIGS. 6A-C are diagrams of examples of various configuration schemes used by a mobile device in the wireless communication system 180 (FIG. 1), in accordance with various embodiments of the present disclosure. FIGS. 6A-C also depict examples of weights assigned to antennas based on respective signal strength metrics according to the various combination schemes discussed with reference to FIG. 5. Moreover, FIGS. 6A-C provide one example, among others, where the signal strength metric is an AGC level. Although an AGC level is used in the examples of FIGS. 6A-C, it should be understood that any signal strength metric or any combination of signal strength metrics can be used to weight each antenna.

FIG. 6A demonstrates an equal gain scheme for two antennas. In this example, the AGC metric of a first antenna 113 (FIG. 1) is calculated to be 0.956 and the AGC metric of a second antenna 118 (FIG. 1) is calculated to be 0.963. Assuming that a predetermined threshold value of 0.1 is used, the difference between these two values, 0.007, is within the predetermined threshold value. Alternatively, the ratio of the AGC of the first antenna 113 over the AGC of the second antenna 118 is 0.956/0.963, which equals 0.992. Assuming that the predetermined threshold range is 0.90-1.11, the ratio between these two AGCs falls within the predetermined threshold. Thus, the processing circuitry 120 (FIG. 1) may consider the signal reception of these two antennas close enough to employ an equal gain scheme. Accordingly, both antennas are weighted equally. In this example, both antennas 113, 118 (FIG. 1) are assigned a weight 213, 223 (FIG. 2) of 1.

FIG. 6B demonstrates a selective combing scheme for two antennas. In this example, the AGC metric of a first antenna 113 (FIG. 1) is calculated to be 0.921 and the AGC metric of a second antenna 118 (FIG. 1) is calculated to be 0.382. Assuming that a predetermined threshold value of 0.3 is used, the difference between these two values, 0.539, exceeds the predetermined threshold value. Alternatively, the ratio of the AGC of the first antenna 113 over the AGC of the second antenna 118 is 0.921/0.382, which equals 2.41. Assuming that the predetermined threshold range is 0.5-2.0, the ratio between these two AGCs falls outside the predetermined threshold. Thus, the processing circuitry 120 (FIG. 1) may consider the signal reception of these two antennas so far apart as to employ a selective combining scheme. Accordingly, the antenna with the relatively higher AGC level is deselected by receiving a weight of zero. In this example, the first antenna 113 receives a weight of zero while the second antenna receives a weight of 1.

FIG. 6C demonstrates a signal strength metric based combing scheme for two antennas. In this example, the AGC metric of a first antenna 113 (FIG. 1) is calculated to be 0.864 and the AGC metric of a second antenna 118 (FIG. 1) is calculated to be 0.987. These two values are neither close together nor far apart. That is to say, these values fall within a predetermined range. Using the examples of the threshold values of FIGS. 6A & B, the predetermined range in this example is 0.1-0.3. Because the difference in these values is 0.123, which is within the predetermined range, the processing circuitry 120 (FIG. 1) may consider employing a signal strength metric based combing scheme. Alternatively, the processing circuitry 120 may analyze whether the ratio of the signal strength metric of the first antenna 113 over the signal strength metric of the second antenna 118 is within a first predetermined threshold range and whether the ratio exceeds a second predetermined threshold range. In the example of FIG. 6, the ratio is 0.864/0.987, which equals 0.875, the first predetermined threshold range is 0.9-1.1 and the second predetermined threshold range is 0.5-2.0. Based on this ration and these predetermined threshold ranges, the processing circuitry 120 (FIG. 1) may consider employing a signal strength metric based combing scheme. Particularly, in this case, the scheme is an ACG-gain based combining scheme. Accordingly, the processing circuitry 120 inputs the signal strength metric into a mathematic equation for calculating a weight. In the example of FIG. 6C, the weight is calculated by taking the reciprocal of the AGC level.

The flowcharts of FIGS. 4-5 show the functionality and operation of an implementation of portions of the processing circuitry 120 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processing circuitry 120 in a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in FIGS. 4-5 may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, processing circuitry 120 in a computer system or other system which includes memory 123 (FIG. 1). In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The memory 123 can comprise non transitory computer-readable medium such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A wireless mobile device, comprising:
   processing circuitry being configured to:
   obtain a first value of a signal strength metric for a first antenna and obtain a second value of the signal strength metric for a second antenna;
   compare the first value with the second value, and when the first and second values are not far apart and are not close to each other based on a predetermined threshold range, determine a first weight for the first antenna and a second weight for the second antenna based on a mathematical expression of the first value and the second value;
   apply the first weight to a primary synchronization signal received by the first antenna to generate a first weighted primary synchronization signal;
   apply the second weight to the primary synchronization signal received by the second antenna to generate a second weighted primary synchronization signal;
   determine a time slot boundary for subsequent reception of data frames by the processing circuitry based upon a sum of the first weighted primary synchronization signal and the second weighted primary synchronization signal.

2. The wireless mobile device of claim 1, wherein the signal strength metric is selected from a group consisting of an automatic gain control level, a signal to noise ratio, and a degree of Doppler shift.

3. The wireless mobile device of claim 1, wherein the processing circuitry is further configured to limit the magnitude of the sum of the first weighted primary synchronization signal and the second weighted primary synchronization signal.

4. The wireless mobile device of claim 3, wherein the processing circuitry is further configured to limit the magnitude of the sum of the first weighted primary synchronization signal and the second weighted primary synchronization signal according to a control signal that specifies a limitation scheme.

5. The wireless mobile device of claim 1, wherein the processing circuitry is further configured to:
   apply the first weight to a secondary synchronization signal received by the first antenna to generate a first weighted secondary synchronization signal;
   apply the second weight to the secondary synchronization signal received by the second antenna to generate a second weighted secondary synchronization signal;
   sum the first weighted secondary synchronization signal and the second weighted secondary synchronization signal to determine a frame boundary for subsequent reception of data frames by the processing circuitry.

6. The wireless mobile device of claim 5, wherein the subsequent reception of data frames by the mobile wireless device comprises receiving a scrambling code from a base station over a cellular network.

7. The wireless mobile device of claim 6, wherein the processing circuitry is further configured to analyze the scrambling code according to the determined time slot boundary and the determined frame boundary.

8. The wireless mobile device of claim 1, wherein the processing circuitry is further configured to set the first weight to zero when a ratio of the first value over the second value is outside the predetermined threshold range.

9. The wireless mobile device of claim 1, wherein the processing circuitry is further configured to set the first weight equal to the second weight when a ratio of the first value over the second value is within a predetermined threshold range.

10. A system for signal processing, comprising:
means for determining a first weight for a first antenna based on a first automatic gain control level associated with the first antenna;
means for determining a second weight for a second antenna based on a first automatic gain control level associated with the second antenna;
means for receiving a primary synchronization signal via the first antenna and the second antenna;
means for weighting the primary synchronization signal received via the first antenna according to the first weight to generate a first weighted primary synchronization signal;
means for weighting the primary synchronization signal received via the second antenna according to the second weight to generate a second weighted primary synchronization signal; and
means for combining the first weighted primary synchronization signal and the second weighted primary synchronization signal to identify a time slot boundary for subsequent reception of data.

11. The system of claim 10 further comprising:
means for receiving a secondary synchronization signal via the first antenna and the second antenna;
means for weighting the secondary synchronization signal received via the first antenna according to the first weight to generate a first weighted secondary synchronization signal;
means for weighting the secondary synchronization signal received via the second antenna according to the second weight to generate a second weighted secondary synchronization signal; and
means for combining the first weighted secondary synchronization signal and the second weighted secondary synchronization signal to identify a frame boundary for subsequent reception of data.

12. The system of claim 10, wherein the means for weighting the primary synchronization signal received via the first antenna comprises means for deselecting the first antenna when the automatic gain control level of the first antenna is less than the automatic gain control level of the second antenna by at least a predetermined threshold value.

13. A method for signal processing, comprising:
comparing a first value of a signal strength metric of a first antenna with a second value of a signal strength metric of a second antenna, and when the first and second values are not far apart and are not close to each other based on a predetermined threshold range, determining a first weight for the first antenna and a second weight for the second antenna based on a mathematical expression of the first value and the second value;
receiving a synchronization signal via the first antenna and the second antenna;
weighting the synchronization signal received via the first antenna according to the first weight to generate a first weighted synchronization signal;
weighting the synchronization signal received via the second antenna according to the second weight to generate a second weighted synchronization signal;
combining the first weighted synchronization signal and the second weighted synchronization signal to generate a combined synchronization signal; and
identifying a transmission boundary to facilitate synchronous communication based on the combined synchronization signal.

14. The method of claim 13, further comprising equally weighting the first antenna and the second antenna when the difference between the signal strength metric of the first antenna and the signal strength metric of the second antenna is within the predetermined threshold range.

15. The method of claim 13, further comprising applying a matrix transformation to the combined synchronization signal.

16. The method of claim 15, wherein the matrix transformation comprises a Fast Hadamard Transform.

17. The method of claim 13, further comprising applying a saturation function to the combined synchronization signal when the combined synchronization signal exceeds a predetermined threshold of maximum magnitude.

18. The method of claim 13, further comprising applying a bit shift function to the combined synchronization signal when the combined synchronization signal exceeds a predetermined threshold of maximum magnitude.

19. The method of claim 13 wherein the signal strength metric is selected from a group consisting of an automatic gain control level, a signal to noise ratio, and a degree of Doppler effect.

20. The method of claim 13, further comprising identifying a scrambling code based on the determined transmission boundary, wherein the scrambling code is transmitted from a base station over a cellular network.

* * * * *